United States Patent [19]
Mohuchy

[11] Patent Number: 5,933,108
[45] Date of Patent: Aug. 3, 1999

[54] GALLIUM ARSENIDE-BASED VECTOR CONTROLLER FOR MICROWAVE CIRCUITS

[75] Inventor: Wolodymyr Mohuchy, Nutley, N.J.

[73] Assignee: ITT Manufacturing Enterprises, Inc., Wilmington, Del.

[21] Appl. No.: 08/838,054

[22] Filed: Apr. 16, 1997

[51] Int. Cl.$^6$ ........................................................ G01S 7/28
[52] U.S. Cl. .............................. 342/175; 342/188; 342/25
[58] Field of Search ................................ 342/175, 81, 154, 342/157, 158, 188, 368, 371, 372, 25

[56] References Cited

U.S. PATENT DOCUMENTS

| | | | |
|---|---|---|---|
| 4,492,960 | 1/1985 | Hislop | 342/175 |
| 4,806,937 | 2/1989 | Peil | 342/175 |
| 4,870,421 | 9/1989 | Peil | 342/175 |
| 4,885,589 | 12/1989 | Edward et al. | 342/175 |
| 4,931,799 | 6/1990 | Wen et al. | 342/110 |
| 4,937,582 | 6/1990 | Mohuchy | 342/188 |
| 5,446,464 | 8/1995 | Feldle | 342/175 |
| 5,815,112 | 9/1998 | Sasaki et al. | 342/70 |

Primary Examiner—John B. Sotomayor
Attorney, Agent, or Firm—Arthur L. Plevy

[57] ABSTRACT

A dual mode microwave vector controller apparatus is disclosed for controlling amplitude and phase characteristics of RF signals. A first set of phase shifting integrated circuit chips (PSICs) is disposed on a semiconductor substrate, each PSIC having an input port for receiving an RF signal and an output port for transmitting amplitude and phase modulated RF signals. A second set of PSICs is disposed on a semiconductor substrate, each PSIC having an input port for receiving an RF signal and an output port for transmitting amplitude and phase modulated RF signals. A first reciprocal planar magic tee integrated circuit chip (RPMT) is disposed on a semiconductor substrate and sandwichedly coupled between the first and second sets of PSICs, having input ports for receiving RF input signals from one set of PSICs and having output ports for transmitting output RF signals corresponding to the sum and difference of the RF input signals to the other set of PSICs. An electronic controller coupled to each of the first and second set of PSICs for control the extent of phase and amplitude adjustment required for each said RF input signal. A second RPMT chip is disposed on a semiconductor substrate and coupled to the second set of PSICs, with input ports for receiving RF input signals and output ports for transmitting output RF signals corresponding to the sum and difference of the RF input signals.

20 Claims, 6 Drawing Sheets

GALLIUM ARSENIDE-BASED VECTOR CONTROLLER FOR MICROWAVE CIRCUITS

FIELD OF THE INVENTION

The present invention relates to semiconductor microwave circuit controlling devices and in particular, to microwave networks configured on GaAs semiconductor substrates capable of controlling relative phase and amplitudes of RF type signals.

BACKGROUND OF THE INVENTION

Modern radar electronics systems, whether employing a single radiating structure such as a simple receiving antenna or high gain dish, or configured as a complex multi-element phased array system, use polarization measurements as a significant processing parameter for processing RF signals. Such polarization techniques and microwave circuitry are described by Mohuchy in a commonly assigned U.S. Pat. 4,937,582 entitled Polarization Adaptive Active Aperture System, issued Jun. 26, 1990 and incorporated herein by reference. Past approaches to controlling signal amplitude and phase characteristics have employed ferrite phase control devices for providing accurate polarization measurements. However, such approaches suffer major disadvantages as a result of the large size of the elements, significant processing time delays, and high manufacturing costs incurred in fabricating them. These disadvantages have limited the manner and nature of the deployment of such systems. Additionally, the RF characteristics of ferrite devices relative to the propagation characteristics in waveguides limit their useful operating bandwidths and make them incompatible with the multi-octave operating capability of modem antennas and RF circuits, currently implemented using high level integrated circuits fabricated on semiconductor materials such as Gallium Arsenide (GaAs).

Consequently, it is greatly desired to have an improved device for controlling and adapting the amplitude and phase characteristics of RF signals. A device employing solid state/microwave integrated circuit chip technology would thus achieve considerable size and cost reductions while increasing the dynamic range.

SUMMARY OF THE INVENTION

Embodiments of the present invention advantageously satisfy the above-identified need in the art by providing a reduced size and lower cost vector controller fabricated in the GaAs transmission medium which is compatible with solid state/microwave integrated circuit technology. The present invention utilizes a GaAs-based vector controller for modulating the amplitude and phase characteristics of RF signals for either receiving (analyzing) or transmitting (controlling) RF signals. Accordingly, a dual mode microwave vector controller apparatus is disclosed, for controlling amplitude and phase characteristics of RF signals. A first set of phase shifting integrated circuit chips (PSICs) is disposed on a semiconductor substrate, each PSIC having an input port for receiving an RF signal and an output port for transmitting amplitude and phase modulated RF signals. A second set of PSICs is disposed on a semiconductor substrate, each PSIC having an input port for receiving an RF signal and an output port for transmitting amplitude and phase modulated RF signals. A first reciprocal planar magic tee integrated circuit chip (RPMT) is disposed on a semiconductor substrate and sandwichedly coupled between the first and second sets of PSICs, having input ports for receiving RF input signals from one set of PSICs and having output ports for transmitting output RF signals corresponding to the sum and difference of the RF input signals to the other set of PSICs. An electronic controller coupled to each of the first and second set of PSICs for control the extent of phase and amplitude adjustment required for each said RF input signal. A second RPMT chip is disposed on a semiconductor substrate and coupled to the second set of PSICs, with input ports for receiving RF input signals and output ports for transmitting output RF signals corresponding to the sum and difference of the RF input signals.

Also disclosed is a chip layout of a phase shift integrated circuit (PSIC) chip for use in a vector controller apparatus disposed on a GaAs semiconductor substrate and having top side A, bottom side B, left side L and right side R defining corners AL, AR, BL and BR, and having a center line C bisecting sides L and R. The PSIC chip layout includes an input port along side L at corner BL for receiving RF signals and an output port along side R at corner AR a maximum distance opposite the input port along a diagonal for transmitting RF signals with minimal coupling interaction between the input and output ports. The chip also has a first digital phase shifting means coupled to the input port for varying the amount of polarization on an RF signal, a second digital phase shifting means coupled to the first digital phase shifting means for varying the amount of polarization on the RF signal and positioned substantially parallel to first digital phase shifting means and displaced from first digital phase shifting means to minimize coupling interactions; a first amplifier coupled to the output of the second digital phase shifting means for amplifying the signal received from the second digital phase shifting means, disposed along side B and extending toward side R, and laterally displaced from the second digital shifting means a distance substantially equal to its width for signal isolation; third digital phase shifting means coupled to the first amplifier and disposed medially within the chip for varying the amount of polarization on said RF signal; an analog phase shifter coupled to the third digital phase shifting means for continuously varying the amount of polarization on the RF signal, and positioned substantially parallel to the third digital phase shifting means to minimize coupling; a second amplifier coupled to the output of the analog phase shifter for amplifying the signal received from the analog phase shifter, disposed above center line C and extending toward side R, where the first and second amplifiers are disposed a distance form each other substantially equal to their width, for signal isolation; and digital converter means disposed along side L for providing serial to parallel conversion of information from an electronic controller to each of the digital phase shifting means in order to control the amount of relative phase shift of each digital phase shifter.

BRIEF DESCRIPTION OF THE DRAWINGS

A complete understanding of the present invention may be gained by considering the following detailed description in conjunction with the accompanying drawing in which.

DETAILED DESCRIPTION OF THE INVENTION

Figure 1:
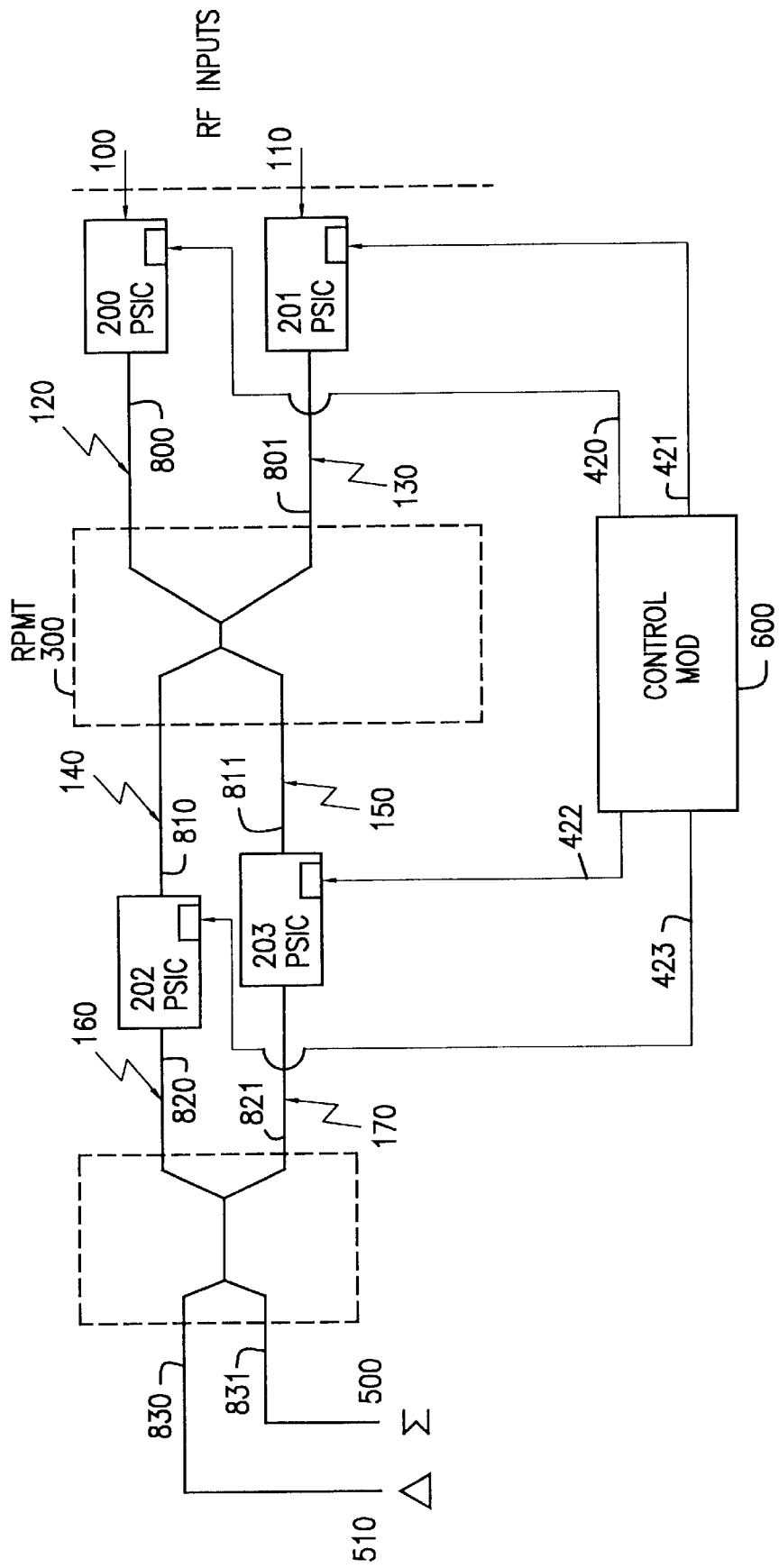
FIG. 1 shows a block diagram of an embodiment of the inventive vector controller apparatus.
Figure 3:
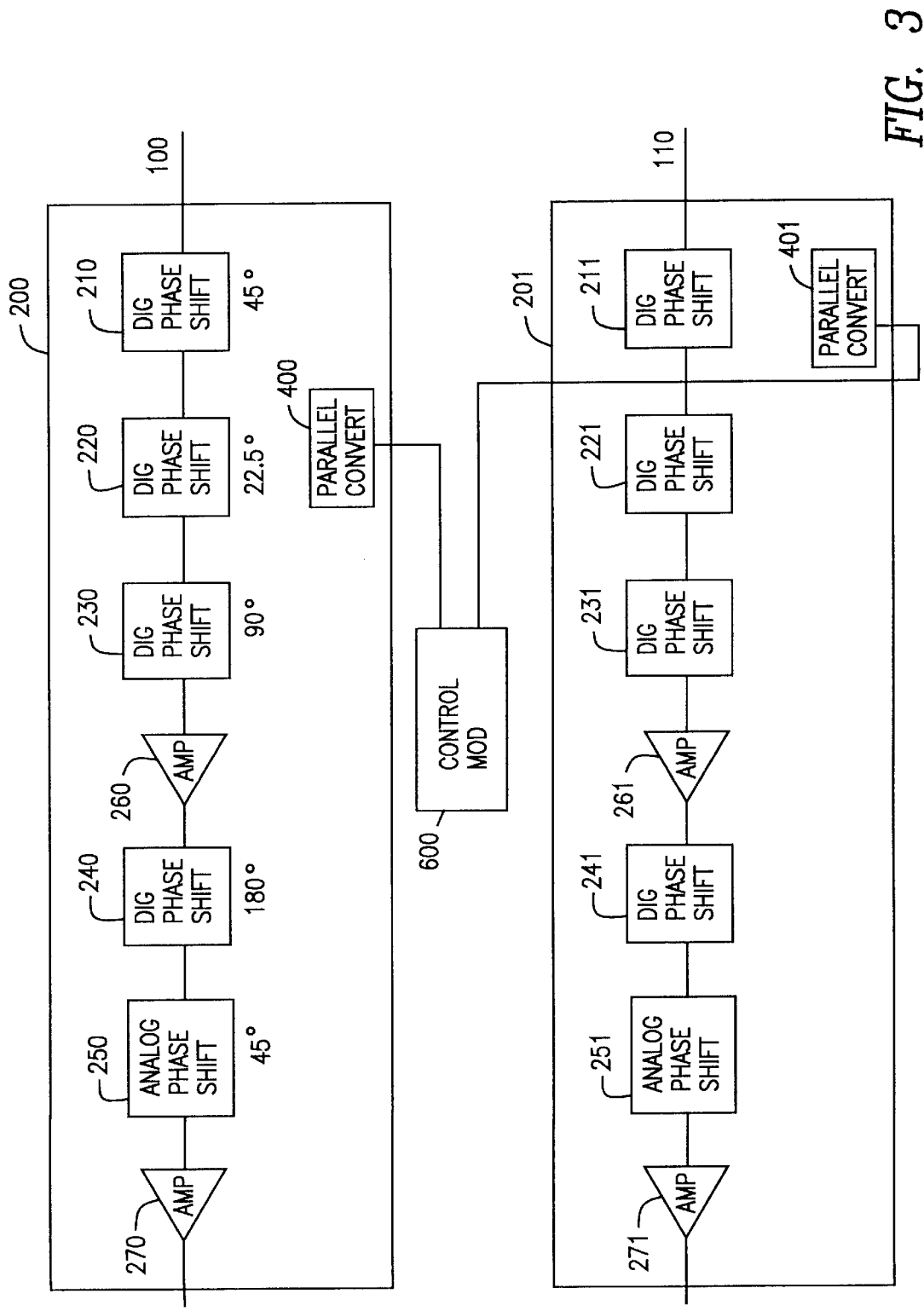
FIG. 3 shows a block diagram of a set of phase shifter integrated circuit chips.
Figure 7:
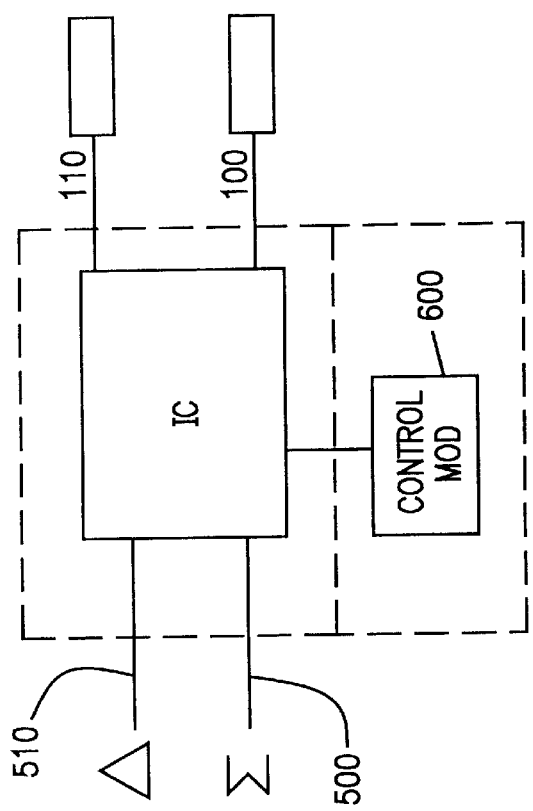
FIG. 7 shows a block diagram of the inventive vector controller apparatus in a measuring device application for analyzing signals.

FIG. 1 shows a block diagram of the embodiment 10 of the inventive vector controller apparatus arranged in a receiving mode. When the invention is operated in a receiving mode, input RF signals 100 and 110 are input to phase shifter integrated circuit (PSIC) chips 200 and 201 respectively. These RF signals may originate from a variety of sources. For instance, as illustrated in FIG. 7, RF signal 100 may be considered as a reference line and 110 as an unknown signal to be analyzed. Alternatively, in an antenna deployment measuring the polarization of an incoming signal, RF signals 100 and 110 may be two orthogonal components of sampled energy, where the objective is to determine the exact polarization of the impinging field for further processing. In any event, PSIC chips 200 and 201 each receive RF signals 100 and 110 respectively. Electronic control module 600 then interacts with each PSIC chip 200 and 201 to indicate the relative amount of phase and amplitude adjustments required on each input RF signal 100 and 110. Such arbitrary phase adjustments require each PSIC chip to be able to adjust the phase and amplitude of each of the RF signals to arbitrary values corresponding to the data transmitted via electronic control module 600. In the embodiment shown in FIG. 3, each PSIC chip can provide for up to 360 degrees of phase adjustment over the full operating frequency band. This is comprised of four bits of digital phase shift, as will be described later, providing up to a total of 337.5 degrees of digital phase shift, and a total of 45 degrees of continuously variable high resolution analog phase shift. Reading FIG. 1 in conjunction with FIG. 3, electronic control module interacts with PSICs 200 and 201 via serial to parallel converters 400 and 401 to identify the desired level of phase shift. In the particular embodiment illustrated in FIGS. 1 and 3, all PSIC chips 200, 201, 202 and 203 are identical in structure and function. Therefore, an in-depth description of one PSIC chip serves to describe the functionality of all other remaining chips. As illustrated in FIG. 3, serial to parallel converter 400 is electronically connected to each of digital phase shifters 210, 220, 230 and 240 by providing either an 'activate' signal (e.g. a binary '1') or an inactivate signal (e.g. a binary '0') to the input of each digital phase shifter over its parallel output lines. If an 'activate' signal is received by a given digital phase shifter, the RF signal waveform incident at the input of the particular shifter will be shifted in phase by an amount equal to that which the particular activated digital phase shifter can provide. Conversely, if an 'inactivate' signal is received by a particular digital phase shifter, no phase shift for a signal passing through that passive element will occur. For example, if all four digital phase shifters receive an 'activate' signal, digital phase shifter 210 provides 45 degrees of phase shift. Digital phase shifter 220, provides 22.5 degrees; digital phase shifter 230, provides 90 degrees; and digital phase shifter 240, provides 180 degrees of phase shift. Similarly, if only digital phase shifters 210 and 230 receive 'activate' signals, an input RF signal will be phase shifted by a total of 135 degrees after passing through elements 210, 220, 230 and 240. An analog phase shifter 250, provides up to 45 degrees of continuously varying high resolution analog phase shift by applying a variable voltage source to its input from control module 600. The relative voltage strength applied to analog phase shifter 250 therefore controls the amount of phase shift. Amplifiers 260 and 270 are placed in series with the digital and analog phase shifters in order to recover the signal lost within the shifting devices and to maintain optimum signal to noise characteristics within the network. The output RF signals 120 and 130 from each of the two 0–360° PSIC chips (200 & 201) represent substantially linearly polarized signals and are transmitted over 50 ohm transmission lines 800 and 801 and applied as input to reciprocal planar magic tee (RPMT) integrated circuit chip 300. A magic tee is well known in the art for providing two signal outputs representing the sum and difference of two input signals. Thus, the first RF signal 140 output from RPMT 300 over 50 ohm transmission line 810 is then input to a third PSIC 202 while the second RF signal 150 output over 50 ohm transmission line 811 is applied to the input of a fourth PSIC chip 203. The two signals input thereto are again phase shifted by an amount determined by the electronic controller 600, which is connected to PSIC chips 202 and 203 through the serial to parallel converter 400 located on each chip. Passing RF signals through this combination of PSICs 202 and 203 removes any remaining circularity resident in the phase characteristics of the input signals and equalizes the corresponding amplitudes. The output RF signals 160 and 170 from the second set of PSICs 202 and 203 are then applied as input to a second RPMT chip 301. As is well known by those skilled in the art, the second RPMT chip receives the two RF signals applied at its input ports and outputs a first RF signal 500 over line 831 which is the sum of the two signals input thereto over lines 820 and 821, and the second RF signal output from RPMT chip 301 over line 830 is the difference of the two signals input thereto over lines 820 and 821 shifted by 180°.

The two resultant RF signals 500 and 510 may then be sampled and appropriately acted upon by the system. As is well known in the art, certain application may iteratively input the initial input RF signals to the vector controller apparatus, sample the sum and difference outputs 510 and 500, and adjust the degree of phase and amplitude shifts necessary at each PSIC chip, in order to achieve desired results.

Figure 2:
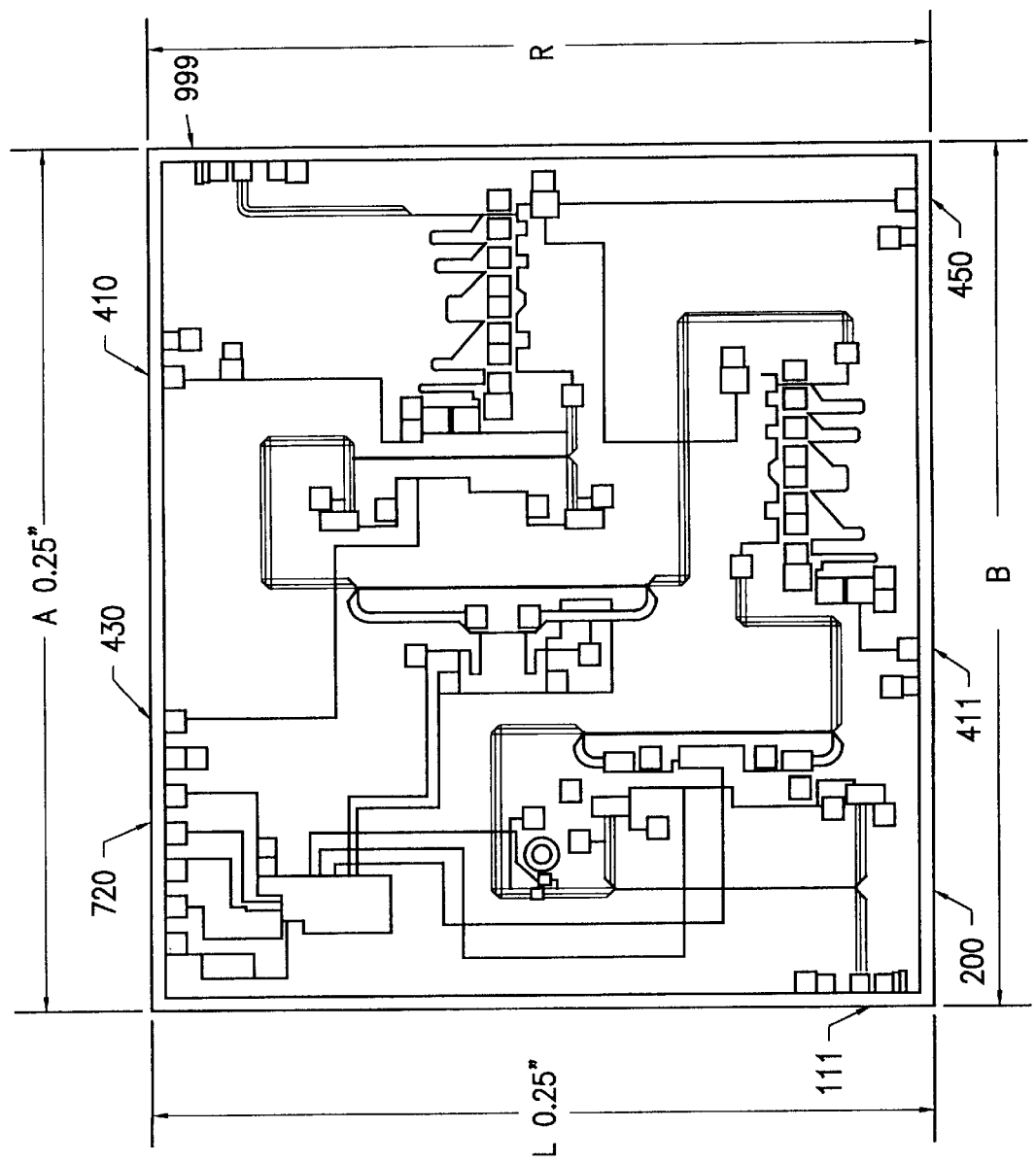
FIG. 2 shows a top view chip layout for the phase shifter integrated circuit chip portion of the inventive vector controller apparatus.
Figure 2A:
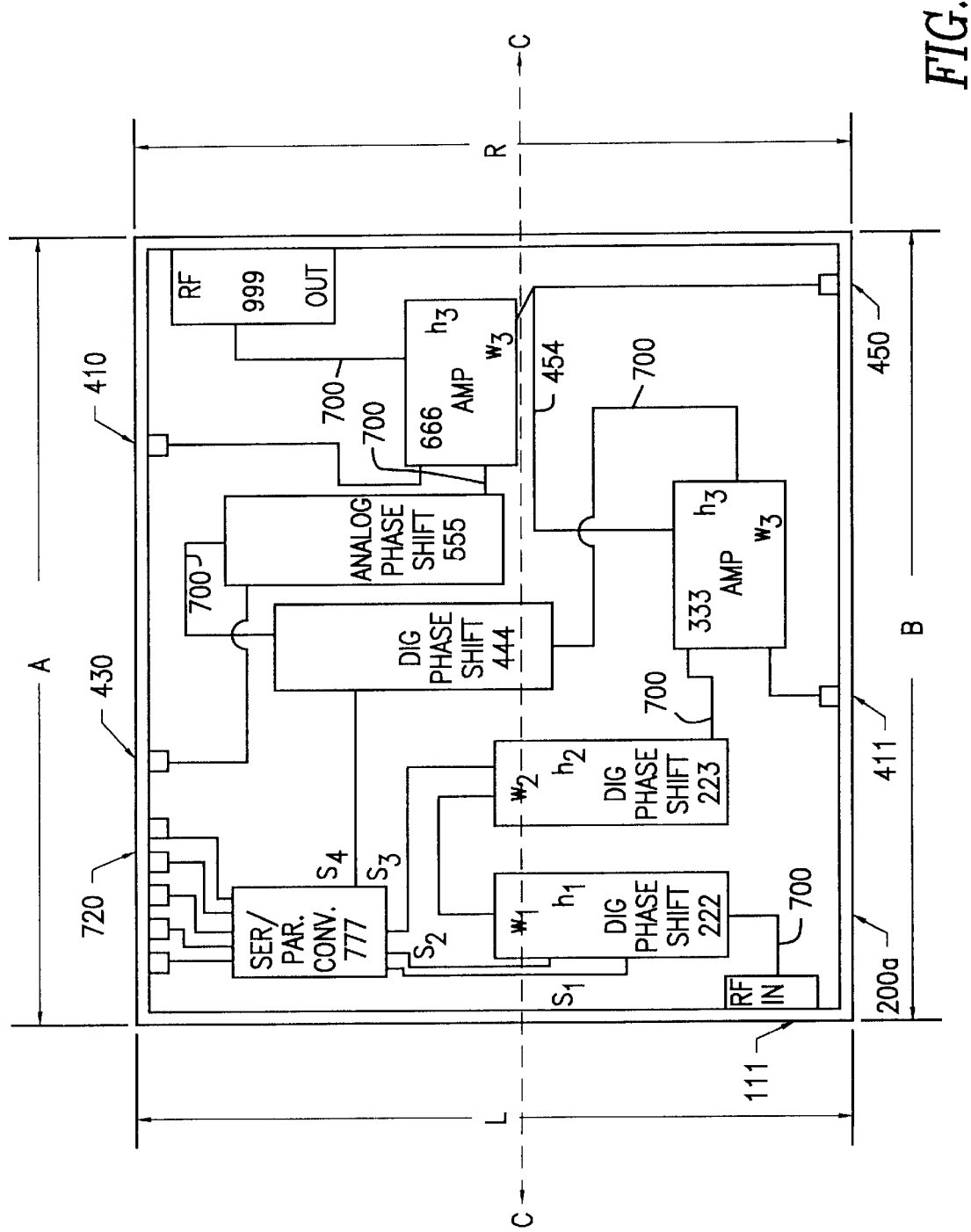
FIG. 2a shows a top view block diagram chip layout for the phase shifter integrated circuit chip portion of the inventive vector controller apparatus.

FIG. 2a shows a top view diagram of the chip layout for the PSIC chip of the present invention disposed on a GaAs substrate. Each of the primary components, their placements within the chip, relative sizes and interconnections are illustrated in block form. As illustrated in FIG. 2a, the PSIC chip 200a is in the form of a square having a top side A, a bottom side B, a left side L and a right side R defining corners AL, AR, BL and BR, and having a center line C bisecting the chip along the horizontal axis. Actual component connections and specific electrode disposal are illustrated in FIG. 2. As illustrated in FIG. 2a, RF input port 111 is located along side L nearest corner LB on chip 200a. RF output port 999 is located along side C near corner AC, a maximum distance from input port 111 along a diagonal in order to minimize adverse coupling between the input and output RF signals. Digital phase shifters 222 having width w1 and length h1 are disposed along the lower portion of side L and extend longitudinally toward top side A, crossing over center line C, and are coupled to input port 111. Digital phase shifters 222 provide up to 67.5 degrees of phase shift in response to activation bias signals s1, s2 from serial to parallel converter 777. Digital phase shifter 223, also having width w1 and length h2, is positioned substantially parallel to digital phase shifters 222 and receives the output signal from digital phase shifters 222 over the 50 ohm transmission line. The 50 Ω transmission line interconnects each of the microwave components residing on chip 200*a* and provides matched impedance within the network. Digital phase shifter 223 provides 90 degrees of phase shift in response to an activation bias signal s3 from serial to parallel converter 777. Amplifier 333 is coupled to the output of digital phase shifter 223 via the 50 ohm transmission line for boosting the signal to noise ratio to recover signal loss resulting from passing the RF signal through the phase shifting circuitry. Amplifier 333 is positioned along bottom side B, extending latitudinally from the midpoint of side B toward side R nearest to corner RB. Amplifier 333 is laterally aligned with input port 111 and latitudinally displaced from digital phase shifters 222 and 223 a distance approximately equal to twice the width w1 of each digital phase shifter circuit in order to isolate the amplifier and attenuate any stray signals emanating from digital phase shifters 222 and 223, thereby minimizing the noise input into the amplifier. Digital phase shifter 444, located medially within the chip and extending over center line C toward top side A, receives the output signal from amplifier 333 and provides 180 degrees of phase shift in response to an activation signal s4 by the serial to parallel converter 777. Serial to parallel converter 777 is positioned above center line C and displaced longitudinally above digital phase shifters 222 and extending toward top side A. Serial to parallel converter 777 has input ports connected to electrodes 720 which are electrically connected to the electronic controller for biasing each digital phase shifter circuit. Serial to parallel converter 777 receives data from the electronic controller over its input ports and sends a signal over each of its output lines to each digital phase shifter to either activate or inactivate the apparatus. Bias electrodes 720 supplying power to the serial to parallel converter are positioned along top side A nearest corner AL, to minimize adverse coupling between active component amplifier bias electrodes 410 and 420 and input and output RF signal ports 111 and 999. The 50 ohm main transmission line 700 coupling amplifier 333 with digital phase shifter 444 extends a distance substantially latitudinally from the output of amplifier 333 toward center line C before bending to a horizontal direction toward side L and terminating at the input of digital phase shifter 444. The length of the L-shaped transmission line coupling the amplifier 333 output signal to digital phase shifter 444 further isolates the signal from any noise resulting from crossover of bias ground conductor 454. The signal output from digital phase shifter 444 is input to analog phase shifter 555 in order to variably shift the RF signal up to 45 degrees. Bias electrode 430 located along top side A and connected to the electronic controller is coupled to analog phase shifter 555 and provides variable voltage strength to control the amount of phase shift. Analog phase shifter 555 is positioned substantially parallel to digital phase shifter 444 and located near top side A and extending through to center line C. The relative lateral displacement of digital phase shifter 444 and analog phase shifter 555 relative to their widths w1 minimizes any adverse coupling between the two components. Amplifier 666 is coupled to the output of analog phase shifter 555 via the 50 ohm transmission line and boosts the signal to noise ratio to recover signal loss resulting from passing the RF signal through the phase shifting circuitry 444 and 555. Amplifier 666 is positioned above center line C and laterally aligned with the middle of digital phase shifter 444 and the lower portion of analog phase shifter 555, extending toward side R nearest to corner AC. Amplifier 666 is also positioned from the 50 ohm transmission line that couples amplifier 333 with digital phase shifter 444 a distance approximately equivalent to its height h3 in order to minimize any coupling between the output of amplifier 333 and the amplifier 666 input. Bias electrode 410, located at top side A nearest corner AR biases amplifier 666, while bias electrode 411, positioned at bottom side B nearest corner BL biases amplifier 333. Ground bias 450, positioned at corner BL, acts as signal ground to both amplifiers 333 and 666 through electrode connections 453 and 455. The position of bias ground a distance from amplifier 333 of approximately one fifth of the total chip size further ensures signal isolation and minimal throughput loss across the entire circuit. Output port 999 receives the RF signal output from amplifier 666 and transmits the signal out of chip 200*a* via 50 ohm transmission line for further processing.

Figure 4:
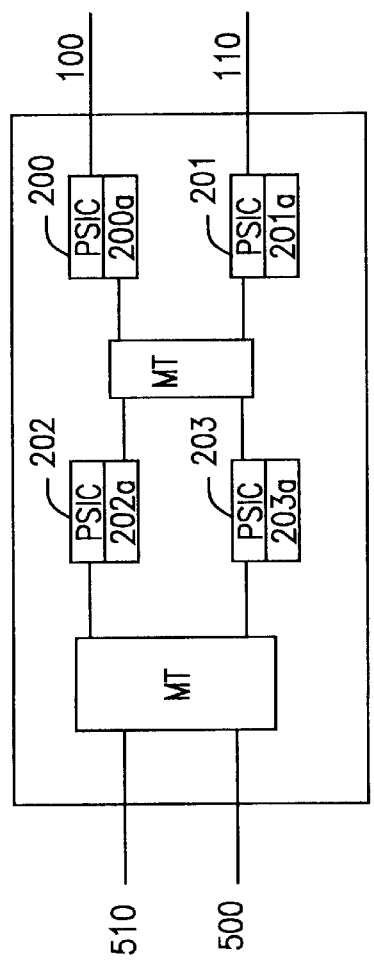
FIG. 4 shows a block diagram of the inventive vector controller apparatus in receive mode.

FIG. 4 illustrates the chip layout of the invention in a receive mode. As illustrated, PSIC chips 200 and 201 each receive input on ports 100 and 110 respectively. RF ports 100, 110, and 500 and 510 may be either micro strip compatible solder tabs or may be miniature co-axial connectors to facilitate assembly into an interfacing RF network. PSIC chip portions 200*a*, 201*a*, 202*a*, 203*a* denote the orientation of the PSIC chips, which is to the connecting side of the electronic controller. This is required since the amplifier circuitry internal to each PSIC chip is non-reciprocal. In order to switch from one mode to the other (e.g. from receive to transmit) the chips must be re-oriented. This can be accomplished by rotating each of the PSIC chips by 180°.

Figure 5:
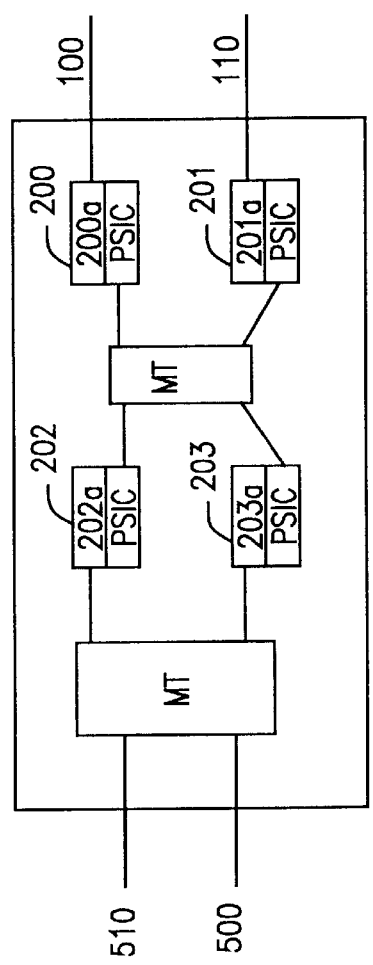
FIG. 5 shows a block diagram of the inventive vector controller apparatus in transmit mode.

FIG. 5 shows the chip layout of the invention in transmit mode. As illustrated in FIG. 5, PSIC chip portions 200*a*, 201*a*, 202*a*, and 203*a* are oriented by 180° from the layout in FIG. 4. It should be noted that RPMT chips need not be reoriented due to the reciprocal nature of the magic tee, as is well known in the art.

Figure 6:
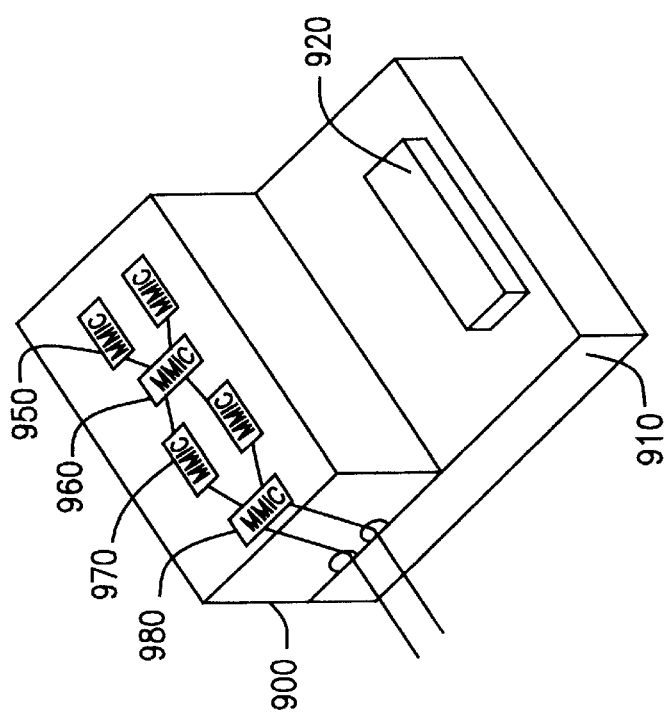
FIG. 6 shows an isometric view of the inventive vector controller apparatus with conductive housing.

FIG. 6 shows an embodiment of the vector controller chip package. In the particular embodiment illustrated, two sets of phase shifter integrated circuit MMIC chips, 950 and 970, are interleavedly coupled with two reciprocal planar magic tee integrated circuit MMIC chips, 960 and 980, on a ceramic substrate 920. The substrate may be a low temperature co-fired ceramic multi layer substrate (LTCC) having conductive channels within its surface. Signal leads from each of the MMIC chips are interconnected to the conductive channels of the LTCC substrate. The LTCC substrate interconnects the control signals via the miniature interface connector 920. An electrically conductive housing 910 is deposited on the substrate to protect the MMIC devices. In this particular embodiment, each of the PSIC chips measures 0.25 inch square. Each RPMT chip is in the form of a 0.25 inch by 0.08 inch rectangle. The housing is 1.00 inches square and 0.60 inches high.

As will be appreciated from the foregoing description, the present invention provides a practical mechanism for implementing and packaging miniaturized monolithic vector controller RF components for integration in a compact support structure.

It will be understood that a person skilled in the art may make many variations and modifications to the described embodiment utilizing functionally equivalent elements to those described. Any variations or modifications to the invention described hereinabove are intended to be included within the scope of the invention as defined by the appended claims.

What is claimed is:

1. A dual mode vector controller apparatus for controlling amplitude and phase characteristics of RF signals having:

a first set of phase shifting integrated circuit chips (PSICs) disposed on a GaAs semiconductor substrate, for receiving RF signals and for transmitting amplitude and phase modulated RF signals;

a second set of PSICs disposed on said GaAs semiconductor substrate;

a first reciprocal planar magic tee integrated circuit chip (RPMT) disposed on said GaAs semiconductor substrate sandwichedly coupled between said first and second sets of PSICs for receiving RF input signals from one set of PSICs and transmitting output RF signals corresponding to the sum and difference of said RF input signals to the other set of PSICs;

an electronic controller coupled to each of said first and second set of PSICs for controlling the extent of phase and amplitude adjustment;

a second RPMT disposed on said semiconductor substrate and coupled to said second set of PSICs for transmitting output RF signals corresponding to the sum and difference of said RF input signals.

2. The apparatus of claim 1, further including a 50 ohm transmission line to couple each of said RPMT chips with each of said PSIC chips.

3. The apparatus of claim 1, further including a conductive housing disposed on said semiconductor substrate encapsulating each of said first and second sets of PSIC chips and said first and second RPMT chips.

4. The apparatus of claim 1, wherein each said PSIC chip is a 0.25 inch square.

5. The apparatus of claim 1, wherein each said RPMT chip is a 0.25 inch by 0.08 inch rectangle.

6. A phase shift integrated circuit (PSIC) chip for use in a vector controller apparatus disposed on a GaAs semiconductor substrate and having a top side A, a bottom side B, a left side L and a right side R defining corners AL, AR, BL and BR, and having a center line C bisecting said sides L and R, said PSIC chip having a chip layout comprising:

an input port along said side L at corner BL for receiving RF signals;

an output port along side R at corner AR a maximum distance opposite said input port along a diagonal for transmitting RF signals with minimal coupling interaction between said input and output ports;

first digital phase shifting means coupled to said input port for varying the amount of polarization on an RF signal;

second digital phase shifting means having width w and coupled to said first digital phase shifting means for varying the amount of polarization on said RF signal, said second digital phase shifting means positioned substantially parallel to said first digital phase shifting means and displaced from said first digital phase shifting means to minimize coupling interactions;

a first amplifier coupled to the output of said second digital phase shifting means for amplifying the signal received from said second digital phase shifting means, said first amplifier disposed along said side B and extending toward side R, said first amplifier laterally displaced from said second digital shifting means a distance substantially equal to the twice the width of said second digital shifting means for signal isolation;

third digital phase shifting means coupled to said first amplifier and disposed medially within said chip for varying the amount of polarization on said RF signal;

an analog phase shifter coupled to said third digital phase shifting means for continuously varying the amount of polarization on said RF signal, said analog phase shifter positioned substantially parallel to said third digital phase shifting means and displaced from said third digital phase shifting means to minimize coupling;

a second amplifier coupled to the output of said analog phase shifter for amplifying the signal received from said analog phase shifter, said second amplifier disposed above center line C and extending toward side R, said first and second amplifiers disposed a distance form each other substantially equal to their width, for signal isolation; and digital converter means disposed along said side L for providing serial to parallel conversion of information from an electronic controller to each of said digital phase shifting means in order to control the amount of relative phase shift of each of said digital phase shifting means.

7. The PSIC chip of claim 6, wherein said first digital phase shifting means comprises a 45 degree digital phase shifter and a 22.5 degree digital phase shifter.

8. The PSIC chip of claim 7, wherein said 22.5 degree digital phase shifter is latitudinally disposed above said 45 degree phase shifter and coupled thereto.

9. The PSIC chip of claim 6, wherein said second digital phase shifting means comprises a 90 degree digital phase shifter.

10. The PSIC chip of claim 6, wherein said third digital phase shifting means comprises a 180 degree digital phase shifter.

11. The PSIC chip of claim 6, wherein said analog phase shifter is operable to variably shift phase up to 45 degrees.

12. The PSIC chip of claim 6, further including a 50 ohm transmission line for coupling components on said PSIC chip.

13. The PSIC chip of claim 6, further including first amplifier bias electrodes for supplying power to said first amplifier, said first amplifier bias electrodes disposed along said top side A.

14. The PSIC chip of claim 13, further including second amplifier bias electrodes for supplying power to said second amplifier, said second amplifier bias electrodes disposed along said bottom side B.

15. The PSIC chip of claim 14, further including bias electrodes for supplying power to said serial to parallel converter, wherein said bias electrodes are disposed along said top side A and displaced from said second amplifier bias electrodes a distance substantially equal to one third of said chip size to minimize coupling.

16. The PSIC chip of claim 14, further including ground bias electrodes disposed along said corner BR and coupled to said first and second amplifiers for grounding.

17. The PSIC chip of claim 12, wherein a portion of said 50 ohm transmission line coupling said first amplifier to said third digital phase shifting means is substantially L-shaped for signal isolation.

18. The PSIC chip of claim 6, wherein said input port and said output port are micro strip compatible solder tabs.

19. The PSIC chip of claim 6, wherein said input port and said output port are miniature coaxial cables.

20. The PSIC chip of claim 6, wherein said PSIC chip dimension is 0.25 inch square.

* * * * *